March 22, 1966  W. W. MALLORY ETAL  3,241,577
AUTOMATIC SUB-SETTER
Filed March 8, 1963  7 Sheets-Sheet 1

INVENTORS
WELMA W. MALLORY,
ERNEST H. JOHNSON,
EDWARD R. WOC
BY
Byron, Hume, Groen & Clement
Attorneys.

March 22, 1966 W. W. MALLORY ETAL 3,241,577
AUTOMATIC SUB-SETTER
Filed March 8, 1963 7 Sheets-Sheet 4

INVENTORS
WELMA W. MALLORY,
ERNEST H. JOHNSON,
EDWARD R. WOC
BY
Byron, Hume, Groen & Clement
Attorneys.

United States Patent Office 3,241,577
Patented Mar. 22, 1966

3,241,577
AUTOMATIC SUB-SETTER
Welma W. Mallory, San Jose, Calif., and Ernest H. Johnson, Parma, and Edward R. Woc, Mentor Headlands, Ohio, assignors to Preformed Line Products Company, Cleveland, Ohio, a corporation of Ohio
Filed Mar. 8, 1963, Ser. No. 265,381
22 Claims. (Cl. 140—92.5)

This invention relates in general to appliances to be used in connection with linear bodies such as electrical conduits, cables, and the like. It relates more particularly to the assembly of a sub-set or half-lay of helically formed elements of the type illustrated in the Peterson Patent No. 2,761,273, entitled "Dead End for Cables," the Ruhlman Patent No. 2,947,504, entitled "Cable Suspension and Anchoring Means and Method," and the Runde Patent No. 2,582,797, entitled "Method of Installing Helically Preformed Elements on Cables," as well as others, each of which is assigned to the same assignee as the present invention. The invention deals specifically with apparatus and a method for assembling an appliance sub-set.

Prior to the development of the present invention the practice, in assembling a sub-set of helically formed wires, for example, was to twist a predetermined number of individual helical wires together by hand. An assembler would take a plurality of wires, five for example, and holding them tightly together, co-extensive with each other, twist the helical wires together in the direction of their convolutions, from one end to the other. This was a manpower consuming and expensive operation when one considers the number of these sub-sets turned out every day, as can well be understood.

It is an object of the present invention to provide a new and improved apparatus and method for assembling an appliance sub-set.

It is another object to provide an apparatus and method for more simply and expeditiously assembling an appliance sub-set.

It is still another object to provide an apparatus and method of the aforedescribed character which facilitates the assembly of an appliance sub-set more inexpensively than presently found possible.

The above and other objects are realized in accordance with the present invention by providing a new and improved apparatus and method for assembling an appliance sub-set. The invention contemplates axially threading a predetermined number of helically formed wires onto each other, one by one, to form a multiple helical wire sub-set. Threading is accomplished by appropriately rotating each wire about its axis as it is introduced axially into engagement with that portion of the sub-set already assembled. As each portion (or partial sub-set) of the sub-set is completed by the addition of another helical wire, the partial sub-est is, in turn, indexed a predetermined additional distance about its axis to facilitate axial introduction of the next helical wire into threaded relationship.

The invention, both as to its organization and method of operation, taken with further objects and advantages thereof, will best be understood by reference to the following description taken in connection with the accompanying drawings, in which.

Figure 1:
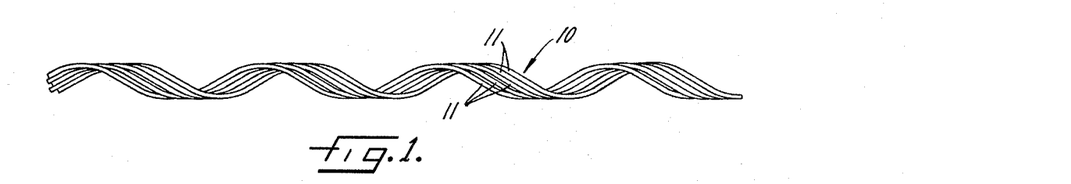
FIGURE 1 is a plan view, enlarged laterally out of proportion, of a sub-set assembled according to the present invention.

Referring now to the drawings and particularly to FIGURE 1, a linear appliance sub-set of the type in question is seen generally at 10. The sub-set 10 comprises a predetermined number of helical wires 11, five in this instance, intertwined in the manner illustrated. The individual helical wires 11 are formed in a well known manner and might be made of any material having satisfactory physical characteristics, such as aluminum, steel or even plastic or the like.

A sub-set 10 is normally eventually twisted together with one or more additional subsets 10, or back upon itself, for example, to form a full-set (not shown) of helical wires. A full-set might be characterized as a sufficient number of helically formed wires intertwined in a prescribed manner to form a complete envelope of wires for a cable or the like.

Figure 2:
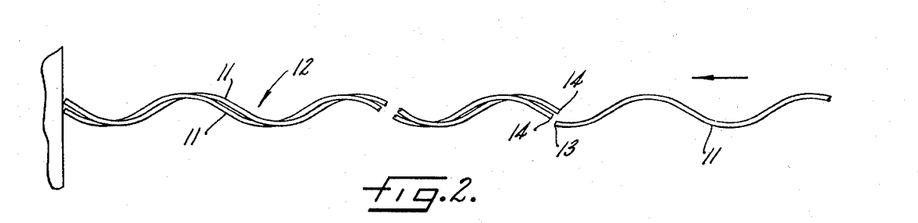
FIGURE 2 is a plan view generally similar to FIGURE 1, showing the assembly of the sub-set illustrated in FIGURE 1 according to the present invention.

Turning now to FIGURE 2, according to the present invention, the helical wires 11 are axially threaded together in the manner illustrated to form the sub-set 10. Each wire 11 is moved axially toward a partial sub-set (which, of course, at the outset is only one helical wire 11), indicated generally at 12, with the leading end 13 radially displaced from the trailing ends 14 of any of the wires 11 already incorporated in the partial sub-set 12. As the wire 11 being introduced is moved axially toward the partial sub-set 12 it is rotated about its axis and accordingly caused to thread its way into the partial sub-set 12 until it is completely threaded therein. As would be expected, a partial sub-set is characterized as any number of assembled helical wires less than a sub-set.

When five of these spiral wires 11 have been threaded together to form the sub-set 10, the internal surfaces of the wire are coated with an adhesive and held in contiguous relationship until the adhesive hardens. The sub-set is then ready for use to form a "dead end," for example, in the manner illustrated in the aforementioned Peterson patent. It will be understood, however, that the sub-set is frequently utilized to form linear appliances other than a "dead end." Furthermore, although five helical wires are utilized in the present instance to form a sub-set 10, more or less than the five wires are sometimes employed.

Figure 3:
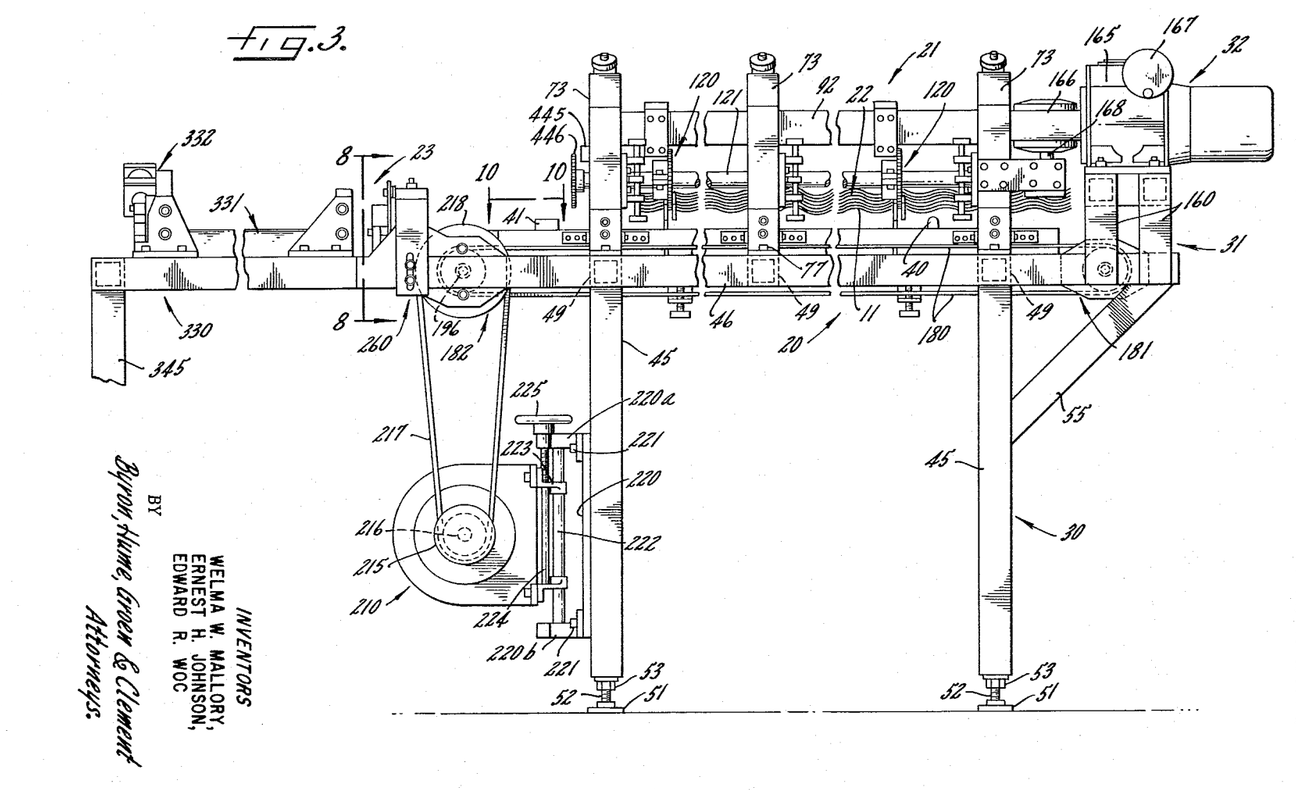
FIGURE 3 is a front elevational view, with parts broken away, of the sub-set assembly apparatus embodying features of the present invention.

The sub-set 10 is automatically assembled in the foregoing manner according to the present invention by an automatic sub-setter, seen generally at 20 in FIGURE 3, and embodying features of the present invention. The sub-setter 20 includes a wire feed unit, seen generally at 21, which automatically feeds individual helical wires 11 a predetermined intervals from a magazine 22 of wires 11 into a receiving unit, seen generally at 23. The receiving unit 23 seats the wires 11 in predetermined relationship until five (in this instance) wires have been threaded together in a sub-set 10 and then automatically drops the sub-set 10 in a preparation for the receipt of another series of helical wires 11.

If a helical wire 11 being fed into the receiving unit 23 is the first wire in a sub-set 10, the receiving unit seats it appropriately in position for receiving the next helical wire 11. The receiving unit 23 indexes the helical wire 11 radially about its axis so that the leading end 13 of the next helical wire 11 to be fed into the receiving unit 23 by feed unit 21 does not come into interference engagement with the trailing end 14 of the helical wire 11 already received. As each successive helical wire 11 is introduced, the receiving unit 23 indexes the partial sub-set 12 in the foregoing manner. The feed unit 12 introduces each helical wire 11 axially into the receiving unit 23 while also rotating the wire 11 whereby the wire 11 is threaded into the partial sub-set 12 already assembled and seated in the receiving unit 23.

Figure 4:
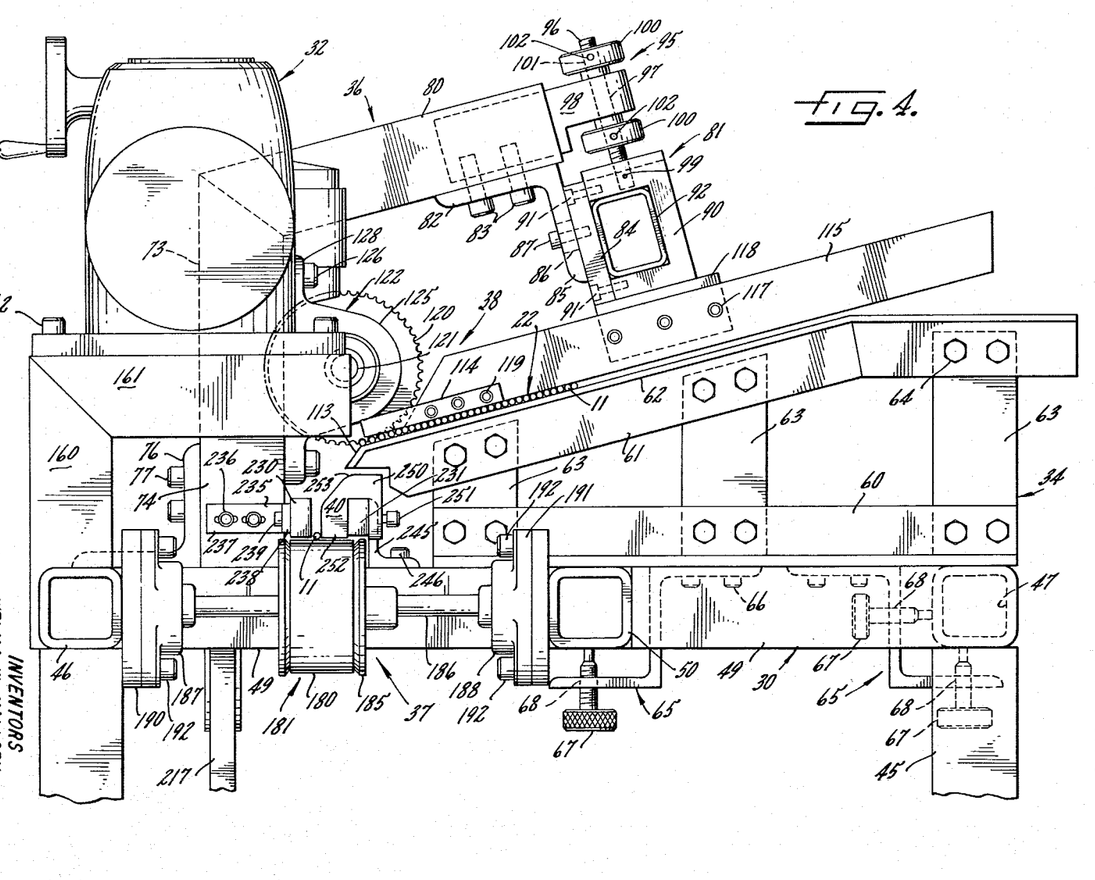
FIGURE 4 is an enlarged end elevational view, with parts broken away, of the apparatus shown in FIGURE 3.
Figures 5, 6:
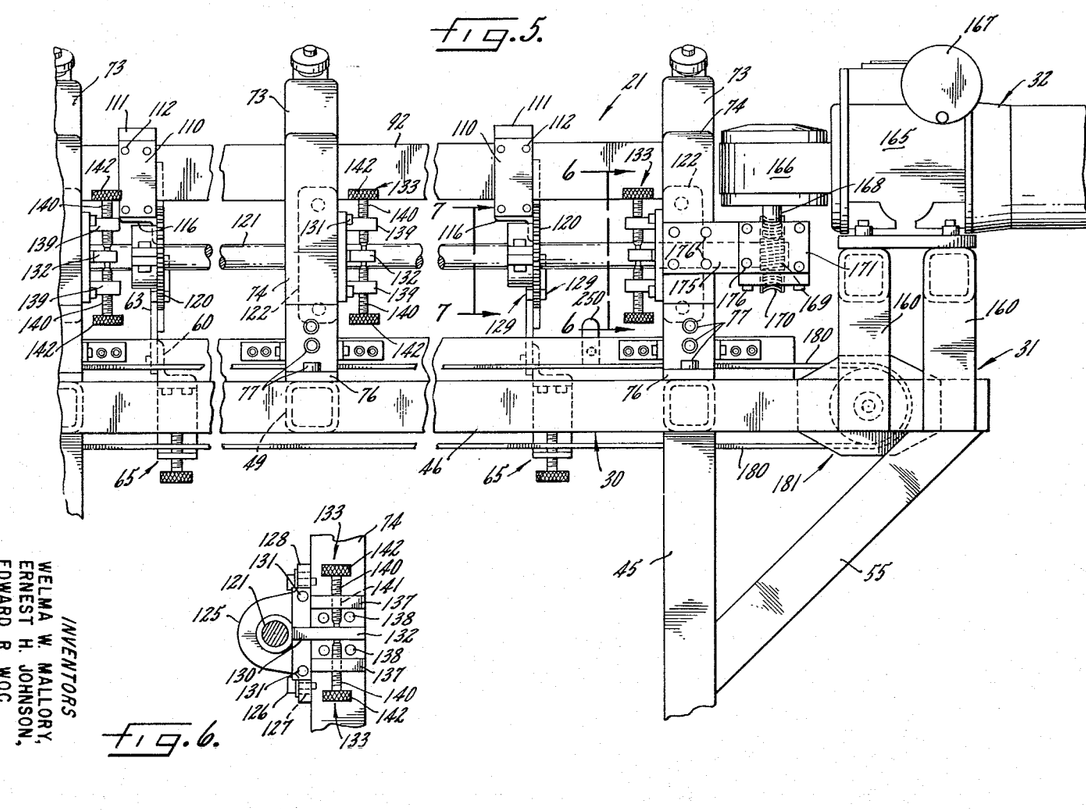
FIGURE 5 is an enlarged front elevational view, generally similar to FIGURE 3, of one portion of the sub-set assembly apparatus illustrated in FIGURE 3.
FIGURE 6 is an enlarged view taken along line 6—6 of FIGURE 5.

Referring now to FIGURES 3–5, the feed unit 21 comprises a table-like main frame 30 which carries a sub-frame 31 at one end for supporting a conventional drive unit 32 for a portion of the feed unit 21. Also mounted on the main frame 30 is a series of inclined platforms 34 for supporting the magazine 22 of helical wires 11 being fed into the sub-setter 20. The main frame 30 further mounts a hold-down assembly 36 which extends into overlying relationship with the magazine 22 of helical wires 11 and forces the wires 11 to maintain a prescribed attitude necessary to assure effective, uninterrupted delivery of the wires 11 to an axial drive assembly 37 by a rotary pick-off assembly 38. Each of the aforementioned assemblies 37 and 38 is also supported on the main frame 30, as will hereinafter be discussed in detail.

In appropriately timed succession, individual helical wires 11 are automatically picked from the magazine 22 of helical wires 11 by the rotary pick-off assembly 38 and delivered to the axial drive assembly 37 for axial introduction into the receiving unit 23. As each helical wire 11 is moved axially by the axial drive assembly 37, it is caused to rotate about its axis by a first rotation initiator 40 associated with the axial drive assembly 37. The induced rotation is maintained, as the wire 11 moves axially, by a second rotation initiator 41 displaced from the first initiator 40 and likewise associated with the axial drive assembly 37.

The main frame 30 comprises four legs 45 formed of substantially square, hollow tubular members, fabricated of sheet metal or the like. A front stringer 46 of substantially identical construction interconnects the front legs 45 and extends longitudinally beyond the legs 45 in one direction to support the sub-frame 31 and longitudinally beyond the legs 45 in the opposite direction to where, as shall hereinafter be discussed in detail, it is joined to the receiving unit 23. The front stringer 46 and the front legs 45 are appropriately joined by welding or the like.

The rear legs 45 (see FIGURE 4) are joined in an identical manner to the back stringer 47 of the same construction. The back stringer 47, unlike the front stringer 46, only spans the longitudinal distance between the rear legs 45. Interconnecting the front stringer 46 and the back stringer 47 are a plurality of cross stringers 49, also of similar construction to the legs 45, seen in dotted lines in FIGURE 3. The cross stringers 49 are also preferably joined to the front stringer 46 and the back stringer 47 by welding or the like.

An intermediate stringer 50, seen in end view in FIGURE 4, is of the same length as the front stringer 46 and extends parallel thereto between the front stringer 46 and the back stringer 47. The intermediate stringer 50 is actually formed of a series of stringer segments (not individually shown) extending between and outwardly from the cross stringers 49, and welded thereto. Similarly to the front stringer 46, to which it is substantially identical, the intermediate stringer 50 is joined to the receiving unit 23.

The legs 45 of the main frame 30 are adjustable as to length. Conventional "feet" 51 having externally threaded pins 52 extending upwardly therefrom are appropriately threaded into machine nuts 53 secured in a well known manner to the bottom of the legs 45. Accordingly, the frame 30 is readily adjusted to seat firmly on floors which are not perfectly level.

A diagonal stringer 55, fabricated in substantially the same manner as the legs 45, is appropriately welded in supporting relationship with one end of the stringer 46, from a corresponding front leg 45, as will be seen in FIGURE 3. It is this end of the front stringer 46 which supports the drive unit 32, of course.

Referring now to FIGURES 4 and 5, each of the inclined platforms 34 for supporting the magazine 22 of helical wires 11 includes a horizontal base member 60 in the form of a conventional angle iron. The base member 60 is interconnected with an inclined slide member 61, having a slight lip 62 along its upper edge, by a series of three vertical members 63. The members 60, 61, and 63, are preferably interconnected by conventional machine bolts, as illustrated, although they might be welded together, for example.

Each inclined platform 34 is adjustably mounted on the main frame 30 with a pair of Z clamps 65 secured to the base of the flanged member 61 by conventional machine bolts 66. Adjusting screws 67 extend through appropriately formed, internally threaded apertures 68 in the legs of the Z clamp 65, engaging the back stringer 47 and the intermediate stringer 50, as seen in FIGURE 4, to facilitate adjusting each platform 34 laterally of the main frame 30 and consequently, because of their inclined relationship, closer to or farther away from the hold-down assembly 36.

The magazine 22 of helical wires 11 is held in predetermined relationship on the inclined platforms 34 by the hold-down assembly 36 as has been pointed out. As best seen in FIGURES 4 and 5, the hold-down assembly 36 includes three inverted L-shaped support members 73 which are mounted on and extend upwardly from corresponding cross stringers 49 of the main frame 30. The inverted L-shaped members 73 are preferably of substantially identical construction to the legs 45 of the main frame 30.

The vertically disposed portion 74 of each of the inverted L-shaped members 73 is seated rearwardly of the front stringer 46 on the main frame 30, as seen in FIGURE 4, and secured to a corresponding cross member 49 by a conventional L-strap 76 and machine bolts 77. Adjustably suspended from the overhanging portions 80 of all the inverted L-shaped members 73 is a hold-down blade sub-assembly 81 which overlies the magazine 22 of helical wires 11.

The blade sub-assembly 81 includes an L-bracket 82 rigidly secured to the overhanging portion 80 of each member 73 (in the manner shown in FIGURE 4) by conventional machine bolts 83. Each bracket 82 carries a generally rectangular plate 84 in vertically adjustable relationship on its depending leg 85. Vertical adjustability is effected through the medium of a vertically disposed slot 86 in each leg 85, and a conventional machine bolt 87 extending freely through the slot 86 into an appropriately threaded receiving aperture in the plate 84.

Secured to each of the plates 84 by a C-shaped bracket 90 and countersunk machine bolts 91 is an elongated tubular support member 92 of substantially rectangular cross-sectional configuration. The tubular member 92 is preferably constructed in substantially the same manner as the legs 45 of the main frame 30, for example, and is of substantially the same length as the back stringer 47 thereof.

The elongated tubular member 92 is vertically adjusted relative to each inverted L-shaped member 73 by a screw adjustment mechanism 95. Each screw adjustment mechanism 95 includes a threaded pin 96 extending freely through a non-threaded aperture 97 formed in a block 98 welded to the end of the freely extending portion 80 of each of the inverted L-shaped members 73. Each threaded pin 96 is fixedly secured to a corresponding C-clamp 90 as by a key 99. Adjustment knobs 100 of substantially identical construction, albeit inverted, having internally threaded apertures 101 extending therethrough, are threaded on each pin 96 above and below the block 98 as illustrated in FIGURE 4. By merely adjusting the knobs 100 upwardly and downwardly on a corresponding threaded pin 96, it will be seen that the elongated tubular member 92 is raised and lowered relative to each inverted L-shaped frame member 73. Set screws 102 in each of the knobs 100 facilitate fixing the pins 96 in predetermined position and consequently fixing the height of the elongated tubular member 92 along its length.

Mounted on the tubular member 92 intermediate the inverted L-shaped members 73, as best seen in FIGURE 5, are generally rectangular plates 110 and C-clamps 111, substantially identical to the plates 84 and the C-clamps 90, hereinbefore discussed. The plates 110 and the C-clamps 111 are secured together about the tubular member 92 by machine bolts 112 in the manner illustrated in regard to the plates 84 and the C-clamps 90.

A hold-down blade 115 for the magazine 22 of helical wires 11 is suspended from each of the plates 110 (and its cooperating C-clamp 111) on an angle iron bracket 116 preferably welded to the base of the corresponding C-clamp 111 and rectangular plate 110. As best seen in FIGURE 4, the blades 115 are spot-welded, as at 117, to the depending legs 118 of the angle iron brackets 116. A blade 115 is positioned over each inclined slide member 61 and a space is defined therebetween as a slideway for the magazine 22 of helical wires 11.

It will now be seen that by manipulating the screw adjustment mechanisms 95 associated with appropriate inverted L-shaped members 73, the hold-down blades 115 are appropriately raised and lowered along the length of the hold-down assembly 36 to adjust the spacing between each blade 115 and a corresponding slide member 61. In practice, five blades 115 are preferably suspended from the tubular member 92, and five inclined platforms 34 are mounted on the stringers 47 and 50, although more or less might be utilized. Only two of each are shown here because parts of the sub-setter 20 are broken away to facilitate a simple illustration and description of the invention. The blades 115 and cooperating slide members 61 are positioned along the helical wires 11 at points corresponding to the pitch length of the helices or multiples thereof, to support the helical wires 11 uniformly.

It will be noted in FIGURE 4 that the spacing between each blade 115 and a corresponding slide member 61 is such that the magazine 22 of helical wires 11 is freely slidable therebetween. Accordingly, the magazine 22 of wires 11 readily slides down the slide member 61 as individual wires 11 are successively picked off the lower end of each slide member 61 by the rotary pick-off assembly 38.

The lower end of each guide member 61 has a downwardly inclined lip 113 formed thereon, the inclination being toward the axial drive assembly 37. The rotary pick-off assembly 38 is effective to kick successive wires 11 over the lip 113 whereupon they fall into the axial drive assembly 37. A pair of guide fingers 114 secured in bracketing relationship with the lower end of each blade 115 cooperates with the rotary pick-off assembly 38 to assure that the helical wires 11 follow this prescribed path. Conventional rivets 119 secure the fingers 114 to corresponding blades 115.

The rotary pick-off assembly 38 includes a pair of pick-off discs 120 mounted for rotation with a longitudinally extending rotatable shaft 121, as best seen in FIGURES 4 and 5. The discs 120 cooperate with corresponding pairs of blades 115 and slide members 61, each pair seen generally at 129 in FIGURE 5, to feed helical wires 11 out of the magazine 22 into the axial drive assembly 37 according to a prescribed schedule.

The shaft 121 is rotatably mounted in vertically adjustable relationship on pillow block assemblies 122 secured to each of the vertically extending legs 74 of the inverted L-shaped frame members 73. As seen in FIGURE 6, each pillow block assembly 122 includes a conventional pillow block 125 which rotatably supports the shaft 121 in bearing relationship. Each pillow block 125 is vertically adjustably secured to a corresponding vertical leg 74 by means of conventional machine bolts 126 extending through vertically elongated apertures 127 formed in the base 128 of each pillow block 125.

A T-shaped bracket 130 is secured to one side of each pillow block 125 by conventional machine bolts 131. The depending leg 132 of each T-shaped bracket 130 is offset outwardly in such a manner that it extends between adjusting screw assemblies 133 secured to the vertically extending leg 74 of each inverted L-shaped member 73. Each adjusting screw assembly 133 includes a mounting plate 137 secured to one side of a corresponding leg 75 by machine screws 138. Each plate 137 has a bracket 139 formed unitarily therewith and extending perpendicularly to the plate 137.

As best seen in FIGURE 5, externally threaded adjusting pins 140 extend through internally threaded apertures 141 in the brackets 139 and engage opposite sides of the offset leg 132 rigidly secured to the pillow block 125. Accordingly, manipulating the knurled knobs 142 on the ends of corresponding threaded pins 140 causes the corresponding pillow block 125 to move upwardly or downwardly a predetermined distance and, correspondingly, move the pick-off discs 120 farther away from or closer to the slide members 61 which support the magazine 22 of helical wires 11 (see FIGURE 4).

Figures 7, 11:
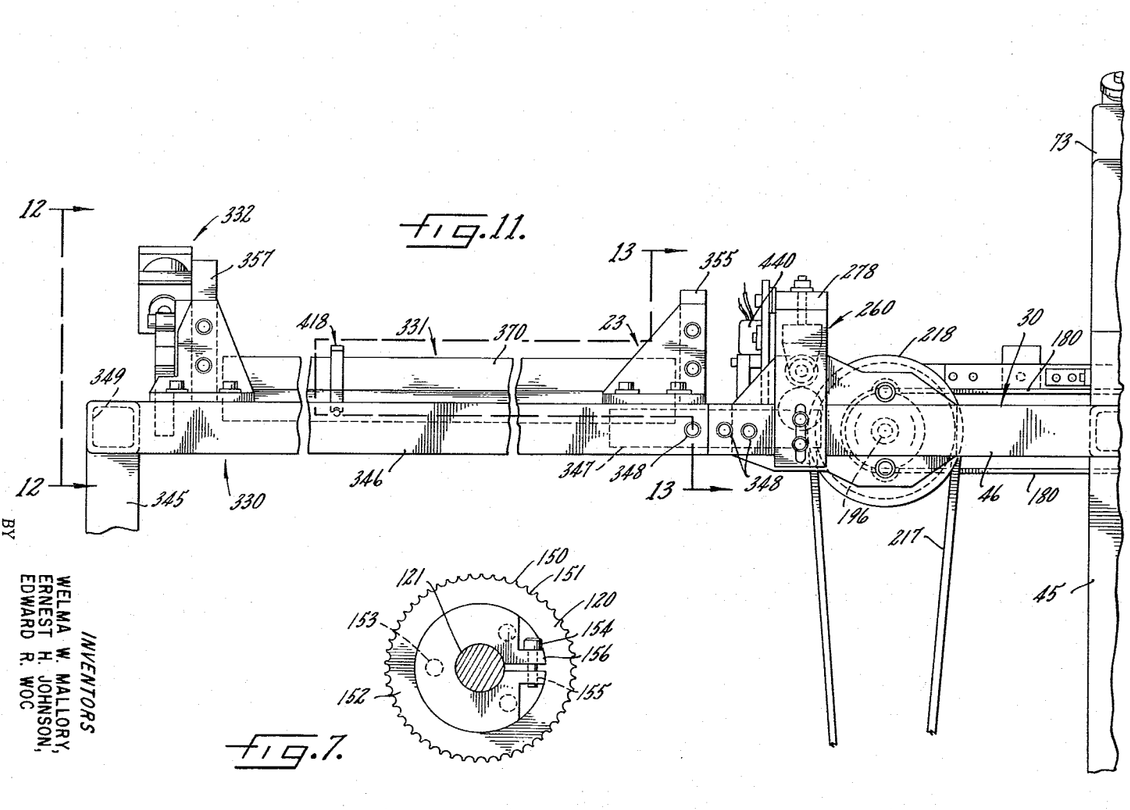
FIGURE 7 is an enlarged view taken along line 7—7 of FIGURE 5.
FIGURE 11 is an enlarged front elevational view, with parts removed, of a portion of the apparatus embodying features of the present invention.

As seen in FIGURE 7, each disc 120 is indented about its periphery 150 to form a succession of individual segmentally circular depressions 151 immediately adjacent each other. It is these depressions 151, of course, which engage individual helical wires 11 and retain them until a predetermined amount of rotation of the discs 120 kicks the corresponding wires 11 over the lips 113 into the axial drive assembly 37.

Each disc 120 is fixedly secured to a ring 152 with machine bolts 152. Each ring 152 is, in turn, clamped on the rotatable shaft 121 by a locking bolt 154 extending through appropriately formed, internally threaded apertures 155 in the ears 156 formed on the ring 152. Each of the two discs 120 is bracketed by a corresponding pair of fingers 114 on the hold-down blades 115 associated therewith, as hereinbefore referred to.

The shaft 121 and, accordingly, the discs 120 are rotated by the drive unit 32 at a predetermined speed to successivelfy pick-off helical wires 11 from the magazine 22. The drive unit 32 is mounted on the subframe 31, as has been pointed out. The sub-frame 31 includes a pair of inverted L-shaped frame members 160, as best seen in FIGURES 3–5, which are secured by welding or the like to the horizontally extending front stringer 46 of the main frame 30. The drive unit 32 is fixedly secured to the horizontally extending legs 161 of the inverted L-shaped frame members 160 by conventional machine bolts 162.

The drive unit 32 includes a conventional fractional horsepower electric motor 165 appropriately connected to a gear box 166. A rheostat control 167 is effective to vary the output speed of the motor and correspondingly vary the output speed of the output shaft 168 extending downwardly from the gear box 166. In a conventional manner, the gear box 166 effects a speed reduction from the output shaft (not shown) of the electric motor 165 to the output shaft 168 of the gear box 166.

As seen in dotted lines in FIGURE 5, the output shaft 168 has a worm gear 169 formed on its lower extremity. The worm gear 169 meshes appropriately with a conventional ring gear 170 (see FIGURE 5) secured to one end of the rotatable shaft 121 extending into the gear housing 171. The gear housing 171, and for that matter the connection between the worm gear 169 and the ring gear 170, are generally conventional and accordingly are not shown in detail. The housing 171 is appropriately mounted on the vertically extending leg 74 of a corresponding inverted L-shaped frame member 73 by a generally rectangular bracket 175 and machine bolts 176.

The motor 165 is pre-set so that the pick-off discs 120 pick helical wires 11 from the magazine 22 and kick them off into the axial drive assembly 37 according to a predetermined time schedule correlated to the speed of the axial drive assembly 37. This relative speed relationship is pre-established whereby each helical wire 11 is fed to the receiving unit 23 by the axial drive assembly 37 before the next helical wire 11 is picked off the magazine 22 by the rotary pick-off assembly 38.

As best seen in FIGURES 3 and 4, the axial drive assembly 37 includes an endless belt 180 trained around pulley units 181 and 182 mounted between opposite ends of the longitudinally extending, parallel stringers 46 and 50 of the main frame 30. The pulley unit 181 (see FIGURE 4) includes a pulley 185 secured to a shaft 186 rotatably mounted at its opposite ends in bearing blocks 187 and 188 of generally conventional construction. The bearing blocks 187 and 188 are preferably secured to corresponding mounting plates 190 and 191, respectively, by conventional machine bolts 192. The mounting plates 191 are, in turn, secured in opposed relationship on the stringers 46 and 50 by welding or the like.

Figures 8, 14:
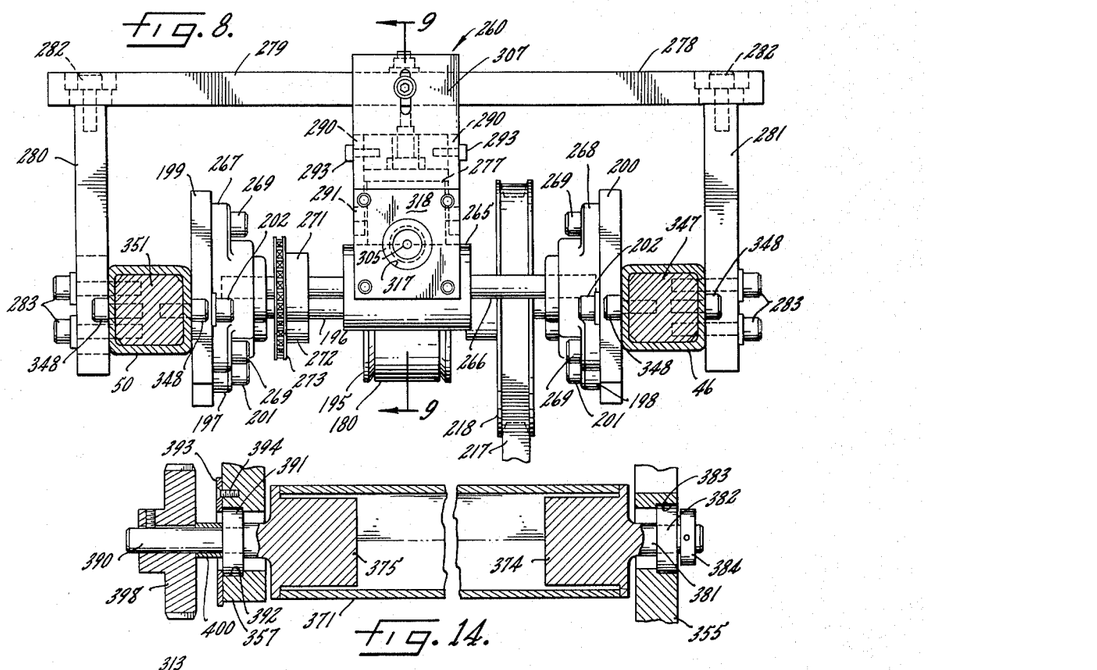
FIGURE 8 is an enlarged view, with parts removed, taken along line 8—8 of FIGURE 3.
FIGURE 14 is a sectional view, with parts broken away, taken along line 14—14 in FIGURE 12.
Figures 9, 10:
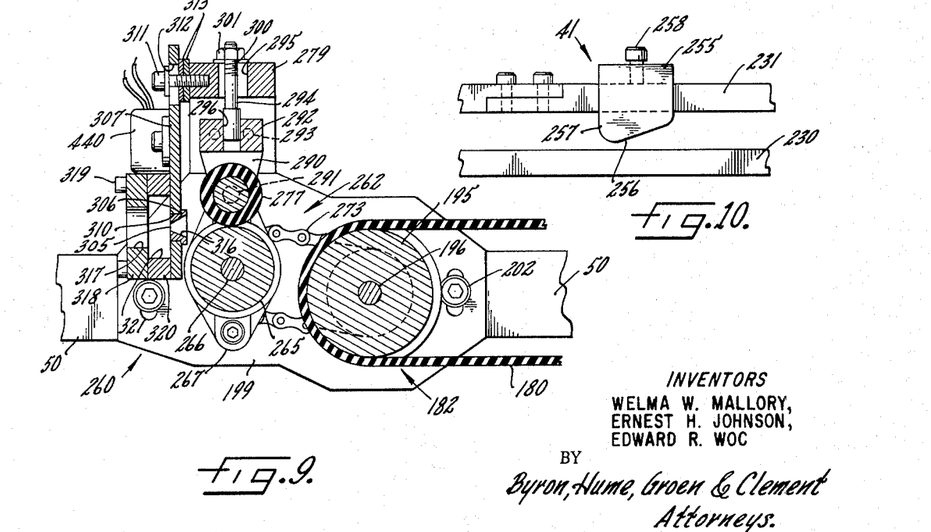
FIGURE 9 is a sectional view taken along line 9—9 of FIGURE 8.
FIGURE 10 is an enlarged plan view, with parts removed, taken along line 10—10 of FIGURE 3.

The oppositely disposed pulley unit 182 is best seen in FIGURES 8 and 9. The pulley unit 182 includes a pulley 195 secured to a shaft 196 rotatably mounted between oppositely disposed bearing blocks 197 and 198, of conventional construction. The bearing blocks 197 and 198 are, in turn, secured to mounting plates 199 and 200, respectively, by conventional machine bolts 201. The mounting plates 199 and 200 are bolted to the oppositely disposed parallel stringers 46 and 50 by machine bolts 202.

The pulleys 185 and 195, and consequently the endless belt 180, are driven by a conventional electric motor 210 (see FIGURE 3) vertically adjustably mounted on corresponding legs 45 of the main frame 30. A drive pulley 215 mounted on the output shaft 216 of the motor 210 is drivingly connected by an endless belt 217 to a pulley 218 mounted on the shaft 196 of the pulley unit 182.

The vertical adjustability of the motor 210 on the legs 45 facilitates adjustment of the tension on the endless belt 217 and also permits removal and replacement of the belt. Vertical adjustability is afforded through the medium of a bracket 220 extending between and secured to the corresponding legs 45 by machine bolts 221. The bracket 220 carries a pair of vertically disposed rods 222 (only one of which is shown) between its perpendicularly disposed upper end 220a and lower end 220b and the motor 210 is secured to a mounting platform 223 slidable on the rods 222.

The mounting platform 223 carries a vertically extending rod 224 secured thereto and extending upwardly through an appropriate aperture in the upper end 220a of the bracket 220. The rod 224 is threaded adjacent its upper extremity and an adjusting knob 225 having an internally threaded aperture (not shown) extending therethrough is threaded onto the rod 224 to afford means for raising and lowering the motor 210 relative to the main frame 30.

When the rotary pick-off assembly 38 removes a helical wire from the magazine and kicks it onto the belt 180, the wire 11 falls between an elongated front guide strip 230 and an elongated rear guide strip 231 (best seen in FIGURES 4 and 5) extending substantially the length of the feed unit 21 and bracketing the wire 11 carrying surface of the endless belt 180. These guide strips 230 and 231 retain each helical wire 11 on the belt 180 as the wire 11 is driven axially into the receiving unit 23.

The front guide strip 230 is preferably supported on the vertically extending legs 74 of the inverted L-shaped frame members 73 with horizontally disposed L-brackets 235. Conventional machine bolts 236 extend through horizontally disposed slots in the transversely extending legs 237 of the brackets 235 and secure the brackets to corresponding legs 74 in transversely adjustable relationship to facilitate moving the front guide strip 230 relative to the rear guide strip 231 and varying the spacing therebetween. The longitudinally extending legs 238 of each L-bracket 235 are appropriately secured to the guide strip 230 with conventional machine bolts 239. Correspondingly, the rear guide strip 231 is mounted on vertically disposed L-brackets 245 secured to corresponding cross stringers 49 of the main frame 30 by machine bolts 246. Each L-bracket 245 is secured to the strip 231 by conventional machine bolts (not shown).

Once a helical wire 11 has fallen onto the belt 180 between the guide strips 230 and 231 and started moving axially under the influence of the belt, it is induced to rotate about its axis by the rotation initiator 40 secured to the inner guide strip 231 adjacent the trailing end 14 of the wire 11. The initiator 40 comprises an inverted U-shaped bracket 250 secured to the strip 231 by a set screw 251. One leg 252 of the bracket is beveled as at 253, and guides the wire 11 loosely against the front guide strip 230. Since the wire 11 is helical in configuration, it then follows that it is caused to rotate about its axis by its own configuration as it is drawn between the leg 252 and the front guide strip 230.

This rotation of the helical wire 11 about its axis is, of course, designed to thread the wire 11 into a partial sub-set assembly 12 which might already be assembled in the receiving unit 23. As the helical wire 11 moves on its path axially toward the receiving unit 23, it comes into engagement with the second rotation initiator 41, hereinbefore referred to, which maintains the rotation of the helical wire 11 about its axis.

The initiator 41, best seen in FIGURES 3 and 10, includes a generally inverted U-shaped bracket 255 (see FIGURE 10) having a longitudinally inclined inner surface 256 formed on one leg 257 and secured to the inner guide strip by a set screw 258. The leading end 13 of the axially moving helical wire 11 moves into engagement with the inclined inner surface 256 on the leg 257 and is once more urged into free but adjacent relationship with the outer guide strip 230. Accordingly, the wire 11 is caused to continue rotating by virtue of its own configuration and axial movement.

It is important to the practice of the present invention that the leading end 13 of each helical wire 11 be introduced to the receiving unit 23 at a predetermined point relative to the trailing ends 14 of the wires 11 already assembled in the receiving unit. Accordingly, the drive assembly 37 includes a wire end 13 positioning unit 260 mounted between corresponding ends of the stringers 46 and 50 adjacent the pulley assembly 182. The wire end positioning unit 260 receives each rotating helical wire 11 from the belt 180 and positions the leading end 13 of the wire 11 in radially displaced relationship with the trailing ends 14 of the wires 11 already assembled in the receiving unit 23. At the same time, of course, the helical wire 11 continues to rotate about its axis to thread into the partial sub-set assembly 12.

As best seen in FIGURES 8 and 9, the wire end positioning unit 260 includes an auxiliary helical wire 11 drive assembly 262 for assisting in driving the axially moving wire 11 through the unit 260. The auxiliary drive assembly 262 grasps the leading end 13 of each wire as it enters the unit 260 and imparts additional positive axial drive to the wire 11, while the wire rotates and passes through the unit 260 into threaded relationship in the receiving unit 23.

The auxiliary drive assembly 262 includes a drive roller 265 affixed to a drive shaft 266 journaled in opposed bearing blocks 267 and 268 mounted on the mounting plates 199 and 200, respectively, with machine bolts 269. A sprocket 271, also affixed to the shaft 266, is connected by a sprocket chain 273 to a sprocket 272 mounted on the shaft 196. Accordingly, the drive roller 265 rotates with the drive pulley 195 for the endless belt 180.

To hold the helical wire 11 against the drive roller 265 and assure effective engagement of the roller 265 with the wire 11, a non-driven roller 277 is suspended freely from a cross frame 278 mounted on the stringers 46 and 50 of the main frame 30. The non-driven roller 277 urges the axially driven helical wires 11 against the drive roller 265. The cross frame 278 includes a horizontal member 279 secured to a pair of depending vertical members 280 and 281 by machine screws 282. The depending vertical members 281 are, in turn, secured to the stringers 56 and 46, respectively, by machine bolts 283.

The non-driven roller 277 is journaled between side plates 290 on a shaft 291. The side plates 290 are joined adjacent their upper extremities by a block 292 through the medium of machine screws 293. A pin 294 is rigidly secured in press-fit relationship in a corresponding aperture 296 in the block 292 and extends freely through a relatively large aperture 295 in the horizontal member 279. The pin 294 is threaded adjacent its upper extremity, as at 300. An adjusting nut 301 is threaded onto the pin 294 and retains the roller 277 in vertically adjustable relationship relatively to the drive roller 265.

As has been pointed out, the practice of the present invention requires that the rotating helical wire 11 enter the receiving unit 23 at a predetermined point. Accordingly, the leading end 13 of each helical wire 11 is driven by the auxiliary drive assembly 262 into a funnel-shaped well 316 having a small aperture 305 formed in its base. The helical wire 11 passes through the aperture 305, which is appropriately positioned radially relative to the trailing ends 14 of the wires 11 already assembled in the receiving unit 23. The radial positioning of these trailing ends 14 of the wires is already established in a prescribed manner by the receiving unit 23, in a manner hereinafter discussed in detail.

The well 316 and the aperture 305 are formed in a ring member 306 seated in a plate 307 mounted for vertical adjustment on the horizontal member 279 on the cross frame 278. The ring 306 is press-fit into an appropriately formed circular cut-out 310 in the lower end of the plate 307 while a machine bolt 311 extends through a vertically elongated slot 312 in the upper end of the plate 307 and mounts the plate 307 on the horizontal member 279. The bolt extends through a pair of shims 313 between the plate 307 and the horizontal member 279, provided to position the aperture 305 at a prescribed distance from the rollers 265 and 277 of the auxiliary drive assembly 262.

It will be seen that the aperture 305 is in substantially horizontal alignment with the cooperating surfaces of the drive roller 265 and the non-driven roller 277. The leading end 13 of each helical wire 11 passes through the aperture 305, and then through an enlarged circular aperture 317 in a substantially rectangular plate 318 secured to the lower end of the plate 307 by conventional machine bolts 319. The plate 318 is appropriately spaced from the plate 307 by a spacer block 320 having an enlarged cut-out 321 formed therein.

After passing through the circular aperture 317, and at a predetermined distance therefrom, the leading end 13 of a driven helical wire 11 engages and begins to thread into an assembled partial sub-set 12 (unless it is the first wire in the sub-set) seated in the receiving unit 23. At the longitudinal exact position at which this threading assembly beings, the radial position of the leading end 13 on the axially driven wire 11 is such that it is displaced from the trailing end 14 of any of the helical wires 11 already assembled in the partial sub-set 12. The displacement is effected by the receiving unit 23 which has appropriately indexed the partial sub-set 12 seated therein so that the trailing ends 14 of the wires 11 in the seated partial sub-set 12 are so displaced.

The receiving unit 23 seats each helical wire 11, as a partial sub-set 12 is assembled, until the completion of a sub-set 10. Then the receiving unit 23 automatically ejects the completed sub-set 10 and repositions itself for the reception of helical wires 11 forming the next sub-set 10. The receiving unit 23 radially indexes each helical wire as it is received from the feed unit 21 so that the lead end 13 of the helical wire 11 immediately following does not come into interference engagement with the trailing end 14 of the wires 11 already assembled.

The receiving unit 23 is, practically speaking, merely an extension of the feed unit 21, and is substantially contiguous therewith. Referring to FIGURES 3 and 11, the receiving unit 23 comprises a main frame 330 which is rigidly joined to the main frame 30 of the feed unit 21. The main frame 330 supports a drop-seat housing 331 for seating and indexing the partial sub-set 12 as it is assembled. A control unit 332 mounted on the frame 330 automatically induces the housing 331 to properly seat a sub-set 10 as it is assembled and automatically drop the finished sub-set 10 when it is completed; to prepare the housing 331 for reception of the helical wires 11 making up the next sub-set 10.

The main frame 330 comprises a pair of legs 345 (see FIGURE 12) substantially identical in construction to the legs 45 of the main frame 30 in the feed unit 21. A front stringer 346 is preferably welded to the upper extremity of the front leg 345 and is joined in end-to-end relationship with the stringer 46 (of the main frame 30) by means of a connector block 347 extending snugly into the hollow interiors of the stringers 46 and 346. Machine bolts 348 extend through the stringers 346 and 46 and the block 347 and secure them together.

A cross stringer 349 extends between and is preferably welded to the upper extremities of the legs 345 and a rear stringer 350. The rear stringer 350 is rigidly joined to the intermediate stringer 50 of the main frame 30 in the feed unit 21 by a block 351 extending snugly into the hollow extremities of each of the stringers 350 and 50. Machine bolts 352 secure the block 351 and the stringers 50 and 350 together.

Figure 12:
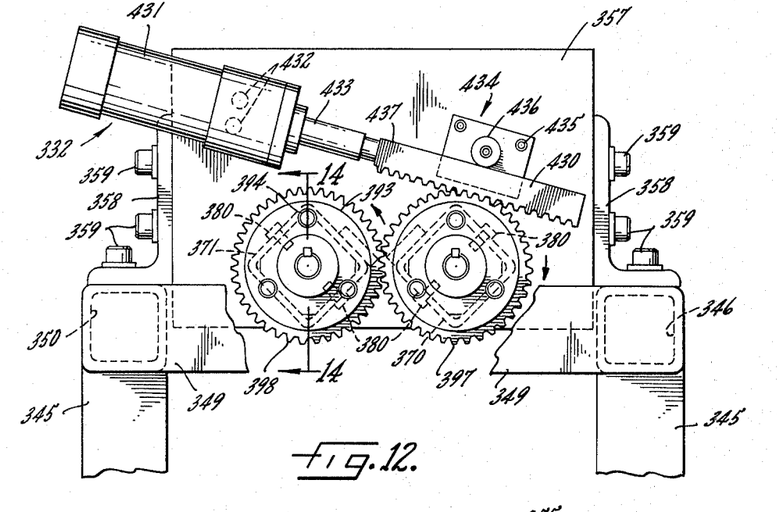
FIGURE 12 is an enlarged view taken along line 12—12 in FIGURE 11.
Figures 13, 15:
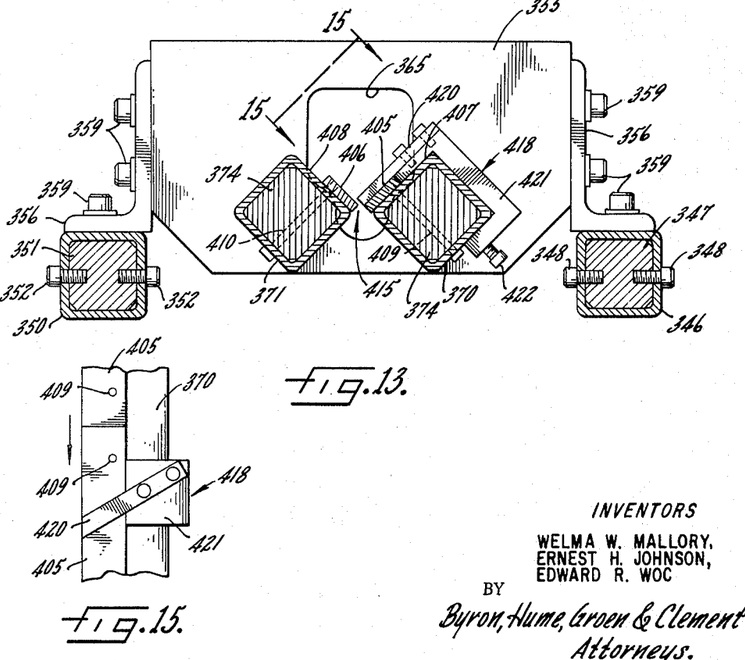
FIGURE 13 is an enlarged sectional view taken along line 13—13 in FIGURE 11.
FIGURE 15 is an enlarged view, with parts removed, taken along line 15—15 in FIGURE 13.

The housing 331 includes an inner end plate 355 mounted between the stringers 346 and 350 on L-brackets 356, and an outer end plate 357 mounted between the stringers 346 and 350 on L-brackets 358 (see FIGURES 12 and 13). Machine bolts 359 secure the plates 355 and 357 and the corresponding stringers 346 and 350 to their respective L-brackets 356 and 358, in a conventional manner.

The inner end plate 355 includes a generally paddle-shaped aperture 365 formed therein to facilitate the passage of helical wires 11 from the wire end positioning unit 260 into a receiving trough, seen generally at 366, which supports the wires 11 as the sub-set 10 is assembled. The seating trough 366 is operatively connected to the control unit 332 and is opened and closed according to a predetermined schedule dependent upon the number of helical wires 11 which form each sub-set 10, five in this case. As best seen in FIGURES 12 and 13, the seating trough 366 includes a pair of substantially square, hollow tubular members 370 and 371 rotatably journaled between the end plates 355 and 357 in bracketing relationship with the lower portion of the generally paddle-shaped aperture 365.

Referring specifically to FIGURE 14, the tubular member 371 includes an inner end bearing plug 374 and an outer end bearing plug 375 which extend into corresponding ends of the tubular member 371 and are secured thereto in identical fashion by machine screws 380 (seen in dotted lines in FIGURE 13). The inner end bearing plug 374 has a bearing neck 381 extending outwardly therefrom and journaled in a conventional ring bearing 382 seated in an aperture 383 extending through the inner end plate 355. A lock ring 384 on the end of the bearing neck 381 prevents its inadvertent withdrawal from the ring bearing 382. The outer end bearing plug 375 in the tubular member 371 includes a bearing neck 390 journaled in a ring bearing 391 seated in an aperture 392 in the outer end plate 357. The ring bearing 391 is held in place in the end plate 357 by a face plate 393 and machine screws 394.

The tubular member 370 and its associated bearing structure are substantially identical in construction to the tubular member 371 and the bearings 381 and 390, for example, hereinbefore discussed. Accordingly, corresponding reference numerals identify like components in each of the tubular members 370 and 371 and their associated bearing structure.

Fixedly secured to each of the bearing necks 390, adjacent their outer extremities, are ring gears 397 and 398 associated with the tubular members 370 and 371, respectively. Spacers 400 separate the ring gears 397 and 398 from the ring bearings 391 in each instance. The ring gears 397 and 398 mesh with each other and effect a counter-rotation of the tubular members 370 and 371 in a prescribed manner when the control unit 332 is actuated. This prescribed counter-rotation of the tubular members 370 and 371 cyclically opens the seating trough 366 to drop a completed sub-set 10 and then closes the seating trough to receive the helical wires 11 for the assembly of the next sub-set 10.

The normal operative relationship of the tubular members 370 and 371 is illustrated in FIGURE 13. In such relationship, a pair of seating strips 405 and 406 are mounted on the upper opposed faces 407 and 408, respectively, of the tubular members 370 and 371, with conventional elongated machine bolts 409 and 410. The strips 405 and 406 extend into immediately adjacent relationship with each other, as at 415. As such, the strips 405 and 406 are adapted to seat the helical wires 11 as the sub-set 10 is assembled. The wires 11 are positioned longitudinally of the strips 405 and 406 by coming into engagement at their leading ends 13 with the outer end wall 357 of the drop-seat housing 331.

As each helical wire 11 is rotated and driven axially into the receiving unit 23 (whether it is the first helical wire 11 in the sub-set 10 or the fifth wire therein), at a predetermined longitudinal position on the strip 405 the wire 11 engages the indexing assembly 418. The indexing assembly 418 causes the corresponding helical wire 11 to rotate a predetermined additional amount to that which it would ordinarily rotate by virtue of the specific pitch of its helices. Consequently, the trailing end 14 of the helical wire 11 rotates a predetermined additional amount also.

This predetermined additional rotation of each helical wire 11 as it is introduced axially into a partial sub-set 12 is calculated to move the trailing end 14 of the helical wire 11 (and consequently the trailing ends 14 of all the helical wires 11 already assembled into the partial sub-set 12) out of end-to-end alignment with the leading end 13 of the immediately succeeding helical wire 11. Accordingly, the assembly of a sub-set 10 continues uninterrupted by end-to-end interference and possible deformation of the helical wires 11.

The indexing unit 418 is best illustrated in FIGURES 13 and 15 where it can be seen to include an angularly disposed indexing member 420 secured to a C-clamp 421 which, in turn, is clamped on the tubular member 370 with a set screw 422. The angularly disposed indexing member 420 overlies the seating strip 405 and is inclined downstream in the direction of travel of the rotating helical wires 11 as they are introduced into the receiving unit 23.

As each additional helical wire 11 encounters the inclined indexing member 420, it is forced to ride up over the member 420 and rotate a predetermined slightly additional amount to that amount of rotation which would ordinarily be expected if the member 420 were absent. Accordingly, the trailing end of the helical wire 11 is moved radially out of alignment with the aperture 305 in the wire end positioning unit 260 and, out of alignment with the leading end 13 of the immediately succeeding helical wire 11 to be introduced into the receiving unit 23.

When a sub-set 10 has been assembled in the foregoing manner, the tubular member 370 is automatically rotated clockwise and the tubular member 371 consequently rotated counter-clockwise by the control unit 332. The finished sub-set 10 is dropped from between the separated seating strips 405 and 406 and then the control unit 332 returns the tubular members 370 and 371 to their closed position, as seen in FIGURE 13.

The control unit 332 rotates the tubular member 370 through the medium of a conventional rack 430 which is in mesh with the gear 397 and is moved axially by a hydraulic motor 431. The hydraulic motor 431 is mounted on the outer end plate 357 by a pair of machine bolts 432, seen in dotted lines in FIGURE 13. The rack 430 is rigidly secured to the stroke arm 433 of the motor 431 in axial alignment therewith and is held in meshing relationship with the ring gear 397 by a conventional roller arrangement 434 secured to the end plate 357 by machine screws 435. The roller arrangement 434 includes a flanged roller 436 which overlies the upper edge 437 of the rack 430 to prevent its becoming disengaged from the ring gear 397.

The hydraulic motor 431 is automatically actuated when a predetermined number of helical wires 11 have been received in the receiving unit 23. Actuation of the motor 431 might be effected by a conventional proximity counter 440, for example, as seen in FIGURES 9 and 11 mounted on the plate 307. The proximity counter 440 sets up a magnetic field in the plate 318, and every time a wire passes completely through the aperture 317 therein, the counter registers. When five wires (in this instance) have passed, the counter 440 signals the motor 431 through conventional circuitry (not shown) and the motor cycles the receiving trough 366 to drop the assembled sub-set 10.

Figure 16:
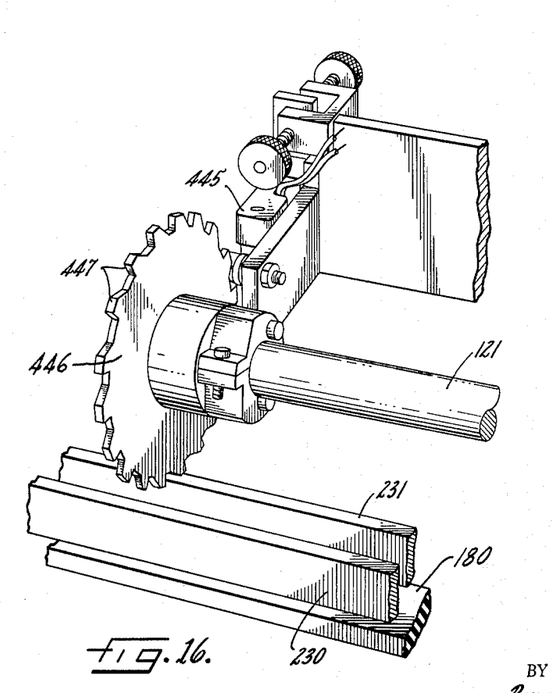
FIGURE 16 is a perspective view of an alternative form of helical wire counter incorporated in the apparatus embodying features of the present invention.

In the alternative, referring to FIGURES 3 and 16, the motor 431 might be actuated by a micro-switch 445 responsive to the rotation of a disc 446 having teeth 447 formed at predetermined intervals around its periphery. The disc 446 is fixed to the shaft 121 for rotation therewith and the teeth 447 are spaced at intervals corresponding to the amount of rotation the shaft 121 undergoes in kicking five helical wires 11 out of the magazine 22 through the medium of the rotary pick-off unit 38. Each time five wires 11 have been fed to the receiving unit 23, the micro-switch 445 is tripped and initiates cyclical operation of the motor 431 in the control unit 332 through appropriate circuitry (not shown) and a full sub-set 10 is dropped. As will be noted, the switch 445 is horizontally adjustable to vary its sensitivity.

To briefly review the operation of the sub-setter 20 in assembling a sub-set 10, it will be recalled that the helical wires 11 are fed to the sub-setter 20 from a magazine 22 supported on a series of inclined platforms 34. The hold-down assembly 36 overlies the magazine 22 of helical wires 11 and retains them in prescribed relationship on the inclined platforms 34. As the helical wires 11 in the magazine 22 reach the lower end of the supporting inclined platforms 34, a rotary pick-off assembly 38 successively kicks individual wires 11 onto an axial drive assembly 37 at prescribed intervals.

The axial drive assembly 37 moves the individual helical wires 11 axially toward the receiving assembly 23 and past the rotation initiators 40 and 41. In being drawn past the rotation initiators 40 and 41, the helical wires 11 are induced to rotate about their axes at a rate of rotation corresponding to the pitch angle of the helices. The leading end 13 of each rotating helical wire 11 is received by the wire end positioning unit 260 and the wire 11 is driven into the receiving unit 23 where it enters a partial sub-set 12 with its leading end 13 in a radially predetermined position.

Correspondingly, the receiving unit 23 indexes the seated partial sub-set 12 so that the trailing ends 14 of the assembled helical wires 11 are displaced radially from the leading end 13 of the entering helical wire 11. Accordingly, the entering wire 11 threads appropriately into the partial sub-set 12 without coming into interference engagement with the wires 11 already assembled. This indexing of the assembled helical wires 11 is induced by the indexing assembly 418.

When a sub-set 10 has been completely assembled in the drop-seat housing 331, the control unit 332 is automatically actuated by the proximity counter 440 (or, alternatively, the micro-switch 445) and the drop-seat housing 331 opens to drop the assembled sub-set 10 into an appropriate storage area below. The drop-seat housing 331 then cyclically closes under the influence of the control unit 332 and is prepared to receive the helical wires 11 for the next sub-set 10.

The present invention has been described solely in the context of seating helical wires in a receiving unit and rotating axially moving wires successively into the seated wires. It should be understood, however, that it is intended that the invention encompass circumstances whereby the seated wire or wires are rotated while non-rotating wires are driven axially into the seated wires. In this light, it is conceivable that rotation of one of the axially driven or seated wires might be induced solely by relative axial movement between the wires.

While an embodiment described herein is at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. An apparatus for assembling a multiple member sub-set from a plurality of helical members comprising; feed means, and receiving means, said feed means including drive means for successively introducing helical members axially into said receiving means, and selector means for selecting helical members from the plurality of members at a predetermined rate and moving them onto said feed means, said feed means further including rotation initiator means for inducing axial rotation of said members as they move axially to effect a threading of the axially-driven members into members seated in said receiving means, said feed means further including positioning means for directing the leading ends of each helical member into said receiving means at a predetermined radial position relative to the trailing ends of the seated members.

2. An apparatus for assembling a multiple member sub-set from a plurality of helical members comprising; feed means, and receiving means, said feed means including drive means for successively introducing helical members axially into said receiving means, and rotary means for selecting helical members from the plurality of helical members at a predetermined rate and moving them onto said drive means, said receiving means seating each helical member in predetermined relationship when it has been introduced therein, wherein immediately succeeding helical members of the plurality of helical members are threaded axially into the helical members already seated in said receiving means.

3. The apparatus of claim 2 further characterized in that said rotary means comprises disc means rotatable about an axis extending substantially parallel to the axes of the helical members, said disc means having a series of indentations peripherally formed therein for cooperating with individual helical members in moving them onto said drive means.

4. The apparatus of claim 2 further characterized in that said drive means includes endless means having a helical member carrying surface, and helical member guide means bracketing said carrying surface.

5. The apparatus of claim 4 further characterized in that said drive means includes rotation initiator means for inducing rotation of the helical members as they are driven axially into said receiving means whereby threading of the succeeding helical members into the seated helical members is effected.

6. An apparatus for assembling a multiple member sub-set from a plurality of helical members comprising; feed means, and receiving means, said feed means including drive means for rotating and successively introducing a plurality of helical members axially into said receiving means, said receiving means including indexing means for additionally rotating each helical member a predetermined amount and seating each helical member in predetermined relationship when it has been introduced therein, wherein immediately succeeding helical members of the plurality of members are threaded axially into the helical members already seated in said receiving means without coming into end-to-end interference with the seated members.

7. The apparatus of claim 6 further characterized in that said indexing means includes an indexing finger, the helical members being threaded axially into said receiving means coming into engagement with said finger and being induced to rotate a predetermined additional amount whereby the trailing ends of each seated helical member are displaced from the radial position at which their leading ends were introduced to said receiving means.

8. An apparatus for assembling a multiple wire sub-set from a plurality of helical wires comprising; feed means including means for supporting a magazine of helical wires in longitudinally extending, laterally movable relationship, rotary pick-off means for successively moving wires from the magazine of wires onto an axial drive means at a predetermined rate, and receiving means, said axial drive means moving said helical wires longitudinally into said receiving means at a predetermined rate correlated with said predetermined rate of movement of said rotary pick-off means, said receiving means seating each helical wire in predetermined relationship when it has been introduced therein, wherein immediately succeeding helical wires are threaded axially into the helical wires already seated in said receiving means.

9. The apparatus of claim 13 further characterized in that said feed means further includes positioning means for directing the leading end of each helical wire into threading relationship with helical wires seated in said receiving means in displaced relationship with the trailing ends of said seated wires.

10. The apparatus of claim 9 further characterized in that said positioning means includes a member defining an aperture, said aperture being positioned in predetermined radial relationship to the trailing ends of the seated wires.

11. The method of claim 19 further characterized by and including the step of introducing said second member into threading relationship with said first member with the leading end of said second member in predetermined radial position relative to the trailing end of said first member.

12. The apparatus of claim 20 further characterized in that said feed means includes positioning means for directing the leading end of each helical member into threading relationship with the helical members seated in said receiving means in displaced relationship with the trailing ends of said seated members.

13. The apparatus of claim 8 further characterized in that said axial drive means includes an endless belt having a helical wire carrying surface, a pair of guide strips bracketing said wire carrying surface and forming an axially extending channel for the axially moving wires, and rotation means for inducing rotation of the axially moving wires, said rotation means including a member means disposed in said channel and secured to one of said strips, said member means being effective to force the axial moving wire loosely against the other of said strips and cause it to rotate axially as it is drawn past said member means by said movement of said endless belt.

14. The apparatus of claim 10 further characterized by and including counting means for determining when a prescribed number of helical wires have been driven into said receiving means, and control means responsive to said counting means to eject a completely assembled multiple wire sub-set upon receipt of a pre-determined signal from said counting means.

15. The apparatus of claim 14 further characterized in that said counting means includes a proximity counter mounted on said positioning means, said proximity counter being effective to count the number of helical wires which have passed through said positioning means and signal said control means when a pre-determined number of the helical wires have passed therethrough.

16. The apparatus of claim 14 further characterized in that said counting means includes a counting disc connected to said rotary pick-off means, said counting disc rotating with said pick-off means and being effective to energize signal means to actuate said control means when a pre-determined number of helical wires have been moved out of said magazine onto said axial drive means by said rotary pick-off means.

17. An apparatus for assembling a multiple member sub-set from a plurality of helical members comprising: feed means and receiving means, said feed means including drive means for successively introducing helical members from the plurality of members axially into said receiving means, said feed means further including rotation initiator means for inducing axial rotation of said members as they move axially to effect a threading of the axially driven members into members seated in said receiving means, said feed means further including positioning means for directing the leading ends of each helical member into said receiving means at a predetermined radial position relative to the trailing ends of the seated members, and auxiliary drive means for directing said members through said positioning means.

18. An apparatus for assembling a multiple member sub-set from a plurality of helical members comprising: feed means, and receiving means, said feed means including drive means for successively introducing helical members from the plurality of members axially into said receiving means, said feed means further including rotation initator means for inducing axial rotation of said members as they move axially to effect a threading of the axially driven members into members seated in said receiving means, said feed means further including positioning means for directing the leading end of each helical member into said receiving means at a predetermined radial position relative to the trailing ends of the seated members, said positioning means including an aperture defining member, said aperture being positioned in predetermined radial relationship to the trailing ends of the seated members.

19. A method of assembling a multiple member sub-set comprising the steps of: seating a first helical member in longitudinally fixed relationship with its trailing end in a predetermined radial position, axially aligning a second helical member with said first member, moving said second member axially towards said first member while rotating said second member about its axis so that said second member threads into said first member, and rotating said second member a predetermined additional amount as it is threaded into said first member whereby the trailing ends of each of said threaded members are displaced from the radial position at which their leading ends were introduced to said receiving means.

20. An apparatus for assembling a multiple sub-set from a plurality of helical members comprising: feed means, and receiving means, said feed means including drive means for successively introducing helical members from the plurality of members axially into said receiving means, said receiving means including indexing means, said indexing means positioning each helical member as it is seated so that its trailing end is displaced from the leading end of the immediately succeeding helical member to be introduced into said receiving means.

21. In combination in an apparatus for assembling a multiple member sub-set, means for storing sufficient total length of helical member to assemble a predetermined number of said sub-sets, means for taking individual helical members of predetermined length from said sufficient length of stored helical member at a predetermined rate and moving them onto drive means, said drive means successively introducing said individual members one-by-one axially onto receiving means, said receiving means seating each helical member in predetermined relationship when it has been introduced therein, wherein immediately succeeding helical members of said predetermined number of helical members are threaded axially into the helical members already seated in said receiving means.

22. The combination of claim 21 further characterized in that said storing means comprises a rack for storing a large number of individual helical members in adjacent, parallel relationship, said means for taking individual helical members comprising means for successively picking individual helical members from said stored helical members and depositing said individual helical members at a predetermined rate on said drive means.

References Cited by the Examiner
UNITED STATES PATENTS
933,475   9/1909   Lloyd ______________ 140—92.4

CHARLES W. LANHAM, *Primary Examiner.*